(12) United States Patent
Webster

(10) Patent No.: US 6,820,295 B2
(45) Date of Patent: Nov. 23, 2004

(54) SUPPORT LEG MOVING APPARATUS AND METHOD

(75) Inventor: Mark Webster, Colgate, WI (US)

(73) Assignee: Kelley Company, Inc., Milwaukee, WI (US)

( * ) Notice: Subject to any disclaimer, the term of this patent is extended or adjusted under 35 U.S.C. 154(b) by 0 days.

(21) Appl. No.: 10/401,948

(22) Filed: Mar. 31, 2003

(65) Prior Publication Data

US 2004/0187233 A1 Sep. 30, 2004

(51) Int. Cl.$^7$ ................................................. E01D 1/00
(52) U.S. Cl. ................................................. 14/69.5
(58) Field of Search .......................... 14/69.5, 71.1, 14/71.3, 71.7

(56) References Cited

U.S. PATENT DOCUMENTS

| | | | |
|---|---|---|---|
| 3,137,017 A | * 6/1964 | Pfleger et al. | 14/71.3 |
| 3,699,601 A | * 10/1972 | Hecker et al. | 14/71.3 |
| 3,728,753 A | * 4/1973 | Beckwith et al. | 14/71.3 |
| 3,835,497 A | 9/1974 | Smith | |
| 3,858,264 A | 1/1975 | Kuhns et al. | |
| 3,877,102 A | 4/1975 | Artzberger | |
| 3,902,213 A | 9/1975 | Pfleger et al. | |
| 3,995,342 A | 12/1976 | Wiener | |
| 4,279,050 A | 7/1981 | Abbott | |
| 4,328,602 A | 5/1982 | Bennett | |
| 4,455,703 A | 6/1984 | Fromme et al. | |
| 4,531,248 A | 7/1985 | Swessel et al. | |
| 4,619,008 A | 10/1986 | Kovach et al. | |
| 4,744,121 A | 5/1988 | Swessel et al. | |
| 4,974,276 A | 12/1990 | Alexander | |
| 5,123,135 A | 6/1992 | Cook et al. | |
| 5,440,772 A | 8/1995 | Springer et al. | |
| 5,551,113 A | 9/1996 | Marler et al. | |
| 5,553,343 A | 9/1996 | Alexander | |
| 5,560,063 A | 10/1996 | Alten et al. | |
| 5,640,733 A | 6/1997 | Alten et al. | |
| 5,784,740 A | * 7/1998 | DiSieno et al. | 14/71.3 |
| 5,813,072 A | 9/1998 | Alexander | |
| 5,832,554 A | 11/1998 | Alexander | |
| 6,035,475 A | 3/2000 | Alexander | |
| 6,061,859 A | 5/2000 | Winter | |
| 6,085,375 A | 7/2000 | Holm | |
| 6,216,303 B1 | * 4/2001 | Massey | 14/71.3 |
| 6,276,016 B1 | 8/2001 | Springer | |
| 6,311,352 B1 | 11/2001 | Springer | |
| 6,327,733 B1 | 12/2001 | Alexander et al. | |
| 6,440,772 B1 | 8/2002 | Smith | |
| 6,460,212 B2 | 10/2002 | Massey et al. | |
| 6,473,926 B2 | 11/2002 | Lounsbury | |
| 6,487,741 B2 | * 12/2002 | Alexander | 14/71.3 |
| 2002/0092102 A1 | 7/2002 | Lounsbury | |

FOREIGN PATENT DOCUMENTS

DE 19913556 A1 * 10/1999 .......... B65G/69/28

OTHER PUBLICATIONS

U.S. patent application Ser. No. 10/324,012, Massey, filed Dec. 20, 2002.
U.S. patent application Ser. No. 10/385,751, Hoofard et al., filed Mar. 12, 2003.

* cited by examiner

*Primary Examiner*—Thomas B. Will
*Assistant Examiner*—Raymond W. Addie
(74) *Attorney, Agent, or Firm*—Baker & Hostetler LLP

(57) ABSTRACT

A support leg system for a dock leveler includes a support leg with a striker surface configured to engage a slider bar. When the striker engages the slider bar at a slow speed, the striker will slide down the slider bar and retract the support legs. However, when the striker engages the slider bar at a high rate of speed, the slider bar will deflect and cause the support legs to remain in a supporting position.

30 Claims, 4 Drawing Sheets

SUPPORT LEG MOVING APPARATUS AND METHOD

FIELD OF THE INVENTION

The present invention relates generally to dock levelers. More particularly, the present invention relates to a dock leveler support leg system and method for reducing the effects of stump-out and free fall.

BACKGROUND OF THE INVENTION

Dock levelers are mounted on loading docks and are used to bridge the gap between a loading dock and the end of a vehicle parked at the loading dock. For example, trucks or tractor trailers may be loaded and unloaded at loading docks with the help of a dock leveler. The dock leveler enables material handling equipment such as a fork lift to move between the dock and the vehicle bed. Because not all vehicle beds are of the same height, many dock levelers are configured to pivot up and down in order to adjust and create a bridge between the loading dock and the vehicle bed. Typical dock levelers include a ramp portion. In addition, dock levelers may include a lip mounted at the end of the ramp. When a vehicle backs up to the dock, often the lip is extended and rests directly on the bed of the vehicle. Some dock levelers use the bed of the vehicle as a support for the lip and the ramp so that vehicles, such as fork lifts, material, and operators move between the vehicle bed and the dock.

If a vehicle, whose bed is supporting the dock leveler, were to pull away from the dock, the dock leveler may become unsupported and move rapidly down to a low position under the influence of gravity and strike the support structure in the pit of the dock leveler. This condition is known in the industry as free fall. Free fall can have unpleasant consequences, particularly when dock workers or material handling vehicles such as fork lifts are on the dock leveler during a time when free fall occurs. Some dock levelers are equipped with devices intended to mitigate the effects of free fall.

One such device used to limit the effects of free fall is a support structure known as a support leg. Typically, a dock levelers have a pair of support legs. After vehicles back up to a loading dock, the dock leveler typically is raised and the lip extended. The dock leveler is then lowered until the lip rests on the bed of the vehicle. When a dock leveler is engaged with a vehicle, the support legs may be slightly above a corresponding support structure configured to support the support legs. Thus, if free fall occurs, the support legs will only permit the dock leveler to fall a limited amount before the support legs engage the support structure.

One problem associated with support legs is that if a vehicle with a bed located below dock level backs up to the dock, the support legs may need to be retracted to allow the ramp to lower until the lip rests on the bed of the vehicle. If the support legs are not retracted, the deck will be supported at a level higher then the vehicle bed and the lip will fall to rest on the bed of the vehicle. Thus, the angle of the lip relative to the vehicle bed will be steeper than normal. This condition of the support legs preventing the ramp from being lowered is known in the industry as stump-out.

Stump-out can also occur as a vehicle is loaded. For example, the support legs may initially be above their support structure when the vehicle first backs up to a dock leveler. But as the vehicle is loaded and becomes heavier, the vehicle suspension may deflect due to the increasing load. As the vehicle bed becomes lower and lower the support legs may engage the support structure thus causing stump-out.

Stump-out can also occur when the support legs are still slightly above the corresponding support structure. As a fork truck moves in and out of the vehicle, deflection of the vehicle suspension will cause the vehicle and the dock leveler to move up and down several inches and cause the support legs to impact the corresponding support structure.

Stump-out can cause a variety of problems. For example, stump-out can lead to a lip angle, which may inhibit material handling equipment such as a fork lift from exiting the vehicle. The steep ramp may also cause the counterweight of a fork lift to impact the lip causing damage to the dock leveler. When stump-out is caused by deflection of the vehicle suspension, the repeated pounding of the support legs on the corresponding support structure can cause structural damage to the dock leveler and to the concrete pit that supports the dock leveler.

In order to avoid stump-out many dock levelers include retractable support legs. These legs can be retracted for servicing truck beds that are below dock level. Typically a pair of support legs are pivotally attached to the ramp near the lip hinge and extend downwardly to engage a supporting sub frame. These Support legs may be spring biased forward toward a supporting position and may be retracted to a non-supporting position by one of several means.

Both manual and automatic mechanisms have been used to retract support legs. Manual support leg retraction mechanisms may require an operator to engage a mechanism, for example, by pulling a chain to retract the support legs as the ramp is being lowered. Automatic support leg retraction mechanisms typically retract the support legs as the lip of the dock leveler is extended. In this way, the support legs are retracted when the lip engages a truck. However, retracting the support legs with manual mechanisms may require additional labor when trying to mate the dock lever to the truck, and retracting the support legs with automatic mechanisms may add complexity to the dock leveler.

Accordingly, a dock leveler that is able to deal with the problems of free fall and stump-out while at the same time reducing the amount of labor and complexity of a dock leveler is desired.

SUMMARY OF THE INVENTION

The foregoing needs are met, to a great extent, by the present invention, wherein in one aspect an apparatus is provided that in some embodiments includes a dock leveler that is able to deal with the problems of free fall and stump-out while at the same time reducing the amount of labor and complexity of a dock leveler.

In accordance with one embodiment of the present invention, a support leg system for a dock leveler is provided. The support leg system includes: a striker, a movable slider bar biased to a first position and configured to move from the first position to a second position when the striker engages the slider bar faster than a predetermined speed, and a first support leg operatively connected to the striker and configured to selectively move between a support position supporting a ramp portion of the dock leveler and a retracted position, the first support leg being biased to the support position and further configured to move to a retracted position when the striker engages the slider bar slower than a predetermined speed and stay in the support position when the striker engages the slider bar faster than the predetermined speed such that the slider bar moves to the second position.

In accordance with another embodiment of the present invention, a support leg system for a dock leveler is provided. The system includes: means for striking, means for sliding biased to a first position and configured to move from the first position to a second position when the striking means engages the sliding means faster than a predetermined speed. The system also includes, means for supporting a ramp portion of the dock leveler operatively connected to the striking means and configured to selectively move between a support position and a retracted position, the supporting means further configured to move to a retracted position when the striking means engages the sliding means slower than a predetermined speed and stay in the support position when the striking means engages the sliding means faster than the predetermined speed such that the sliding means moves to the second position.

In accordance with yet another embodiment of the present invention, a method of supporting a ramp portion of a dock leveler is provided. The method includes: at least one of: lowering a dock ramp faster than a predetermined speed and thereby cause a striker to deflect a slider bar and thereby cause a support leg to be in a support position; and lowering a dock ramp slower than a predetermined speed and thereby cause a striker to slide across a slider bar and thereby cause a support leg to retract.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

According to one embodiment of the present invention, a support leg system for a dock leveler is provided. Some embodiments include a striker connected to a support leg and a moveable slider bar biased to a first position. The slider bar can move from the first position to a second position when the striker engages the slider bar faster than a predetermined speed.

The support leg is configured to selectively move to between the support position, which supports the ramp portion of the dock leveler, and a retracted position. The support leg is biased to the support position and will stay in the support position wherein the striker engages the slider bar at such a high rate of speed that the slider bar moves from the first position to the second position. When the striker hits the slider bar at a slower rate of speed, the slider bar will stay in the first position and the striker will slide down the slider bar causing the support leg to move to a retracted position. Some of the benefits of the present invention are that the dock leveler is able to deal with the problems of free fall and stump out and at the same time reduce the amount of labor and complexity of the dock leveler.

Figure 1:
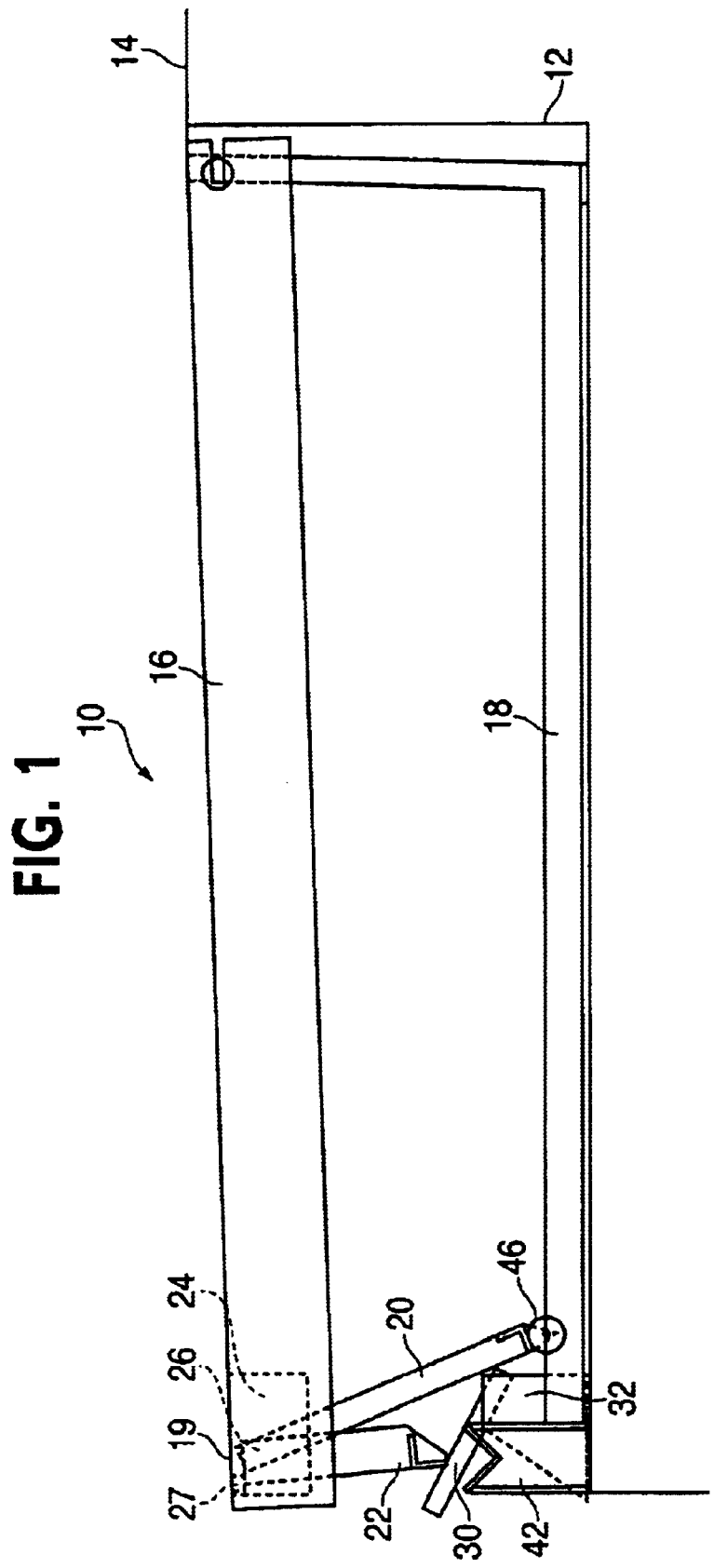
FIG. 1 is a side view of a dock leveler having a support leg system according to one embodiment of the invention.

The invention will now be described with reference to the drawing figures in which like reference numerals refer to like parts throughout. An embodiment in accordance with the present invention is shown in FIG. 1. In FIG. 1, a dock leveler 10 is shown in a schematic side view. The dock leveler 10 is located in a recess 12 known as a pit 12 in a loading dock 14. The dock leveler 10 has a ramp 16 that pivots up and down. The ramp 16 is pivotally attached to a frame 18. Normally, a lip is pivotally attached to the end 19 of the ramp 16 away from the dock 14, and it is the lip that engages the bed of a vehicle (not shown) backed up to the loading dock 14. However, in FIGS. 1–4 the lip is not shown in order to better show the support leg system and apparatus described herein.

According to the embodiment shown in FIG. 1, two sets of support legs, a longer set 20 and a shorter set 22, are attached to the ramp 16. One purpose for having two sets of support legs 20, 22 is that if the longer set of support legs 20 are retracted or partially retracted, the second set of support legs 22 could support the ramp 16 if the ramp 16 where to suddenly go into a free fall condition The support legs 20, 22 are pivotally attached to the ramp 16 via a leg attaching assembly 24 and share a common hinge pin 26. The support legs 20,22 but up against a stop portion 27 of the attaching assembly 24 to limit the forward movement of the support legs 20, 22. In other embodiments, the support legs 20, 22 may but up against the bottom of the ramp 16 when in the support position. The support legs 20, 22 are biased to the support position by a spring 28 (shown in FIG. 3). In some embodiments of the invention, multiple hinge pins 26 may be used to attach the support legs 20, 22 to the ramp 16 rather than a single long hinge pin 26. A slider bar 30 is pivotally attached to a slider bar support 32. The slider bar support 32 is attached to the pit 12.

Figure 2:
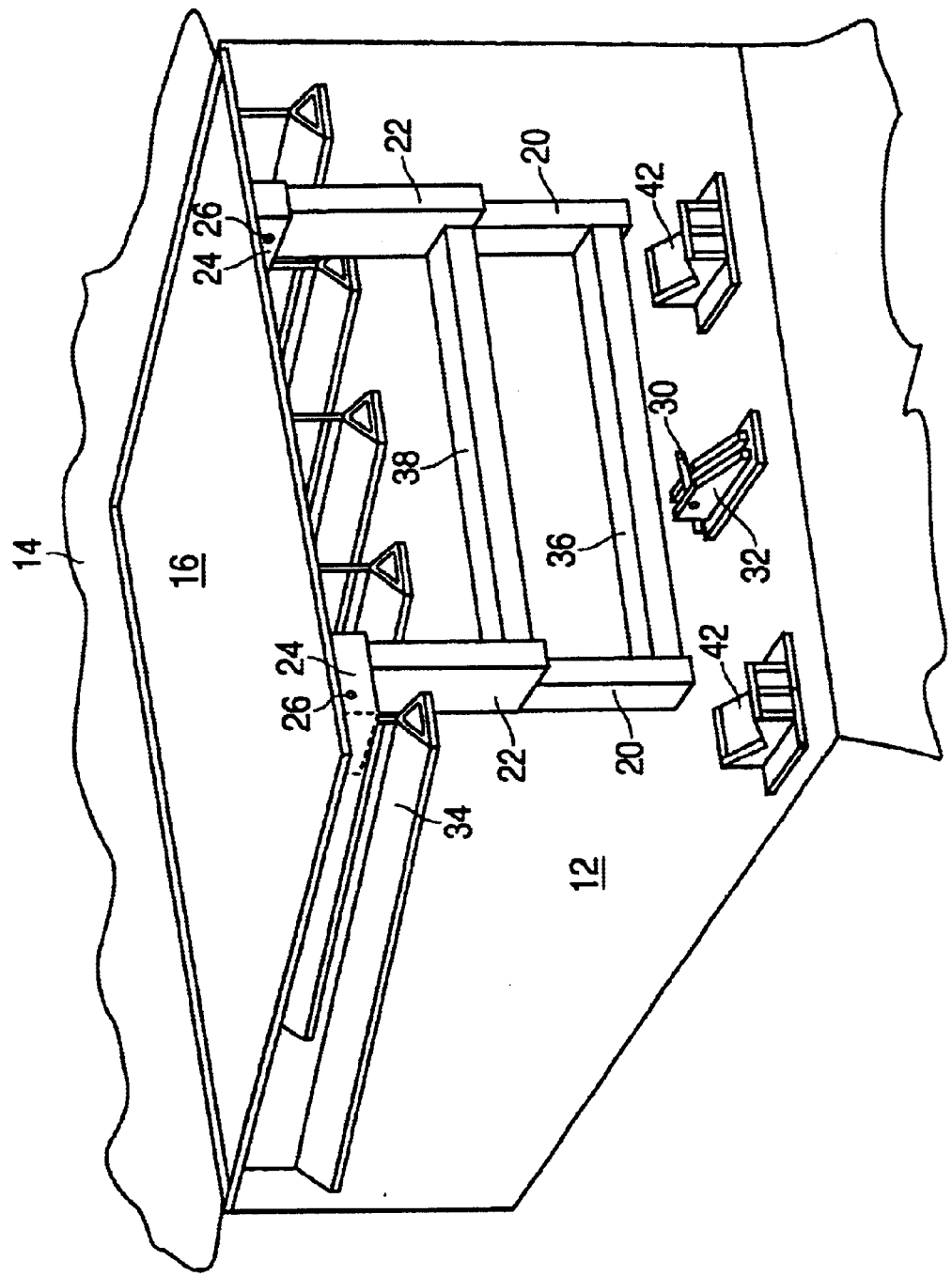
FIG. 2 is a perspective view of the dock leveler having a support leg system of FIG. 1, but without the roller.

Turning now to FIG. 2, the dock leveler 10 is mounted in a pit 12 portion of a loading dock 14. As mentioned, the lip portion of the dock leveler 10 has been removed from FIG. 2 in order to more fully illustrate the support leg system according to the invention. The support legs 20 and 22 are pivotally mounted by hinge pin 26 to a leg attaching assembly 24 attached to a bottom portion of the ramp 16. The legs 20, 22 are shown located between support beams 34 but, could be pivotally attached to a support bar 34. The longer support legs 20 are connected to each other by a cross bar 36. The shorter support legs 22 are connected to each other by a cross bar 38. Cross bars 36,38 are configured to contact the slider bar 30 and act as a striker. In embodiments where the cross bars 36, 38 act as strikers, they may be referred to as strikers 36, 38 as well as cross bars 36,38. Other embodiments of the invention may have a separate apparatus as a striker or use the cross bars 36 and/or 38 to carry a specific striker configured to contact the slider bar 30.

When the ramp descends slowly, cross bar 36 or if the legs 20 are retracted or partially retraced, cross bar 38 will contact the slider bar 30. The slider bar 30 is biased to a position where the end of the slider bar 30 closer to the pivoting end of the ramp 16 is lower than the other end of the slider bar 30 (the position shown in FIG. 2) by a spring 40 (shown in FIG. 3.).

Figure 3:
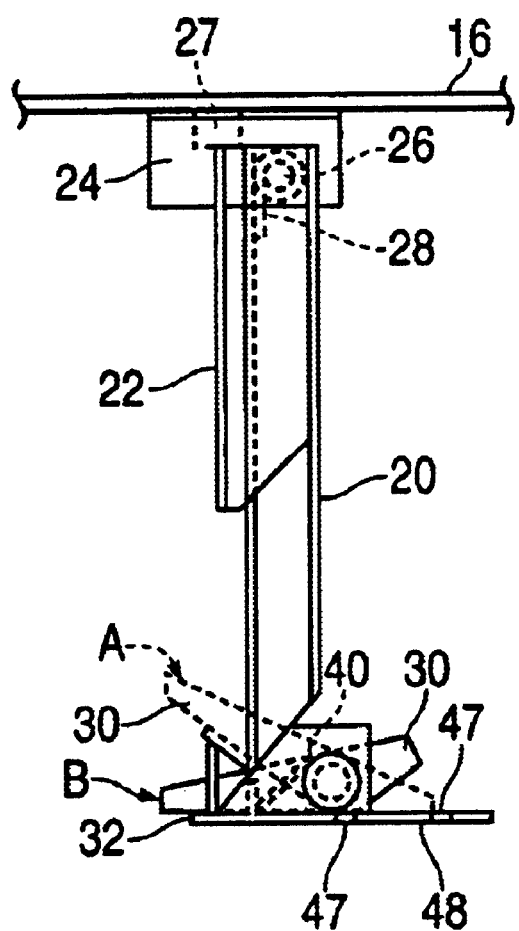
FIG. 3 is a detailed side view of the support leg system of FIG. 2.

When the striker 36, 38 encounters the slider bar 30 at a relatively slow speed, the spring 40 (shown in FIG. 3) is able to maintain the slider bar 30 in the biased position and the striker 36, 38 will slide down the slider bar 30. The striker 36, sliding down the slider bar 30 will cause the legs 20, to retract and if the striker 38 slides down the slider bar 30 the legs 22 to retract. However, were the ramp 16 to descend in a rapid manner (i.e., a free fall condition) the striker 36, 38 would contact the slider bar 30 at a relatively high velocity. The spring 40 (shown in FIG. 3) would not be able to overcome the inertia associated with the striker 36 or 38 and the support legs 20, 22 hitting the slider bar 30. So the spring 40 would deflect and cause the slider bar 30 to move to a second position as shown in FIG. 3 and denoted by arrow B. When the slider bar 30 achieves the position shown in FIG. 3 denoted by arrow B, the striker 36,38 will not be urged to slide down the slider bar 30 and retract the legs 20, 22, but rather the legs 20, 22 will remain in a support position and the legs 20, 22 will engage the leg support 42 and support the ramp 16.

According to some embodiments of the present invention, the support legs 20, 22 may not be fully retracted after the striker 36, 38 has slid down the length of the slider bar 30. In such cases, the support legs 20, 22 may continue to retract by sliding along, the pit 12 as the ramp 16 continues to descend. In some embodiments a sliding surface may be mounted to the pit 12. Optionally, a roller 46 (as shown in FIG. 1) is attached to the bottom portion of the support leg 20. The roller 46 may roll along the pit 12.

It will be apparent to one skilled in the art that design choices regarding the springs 28 and 40 will need to be made in order to achieve the sliding/retracting motion of the striker 34 or 36 and legs 20 or 22 or the deflecting motion of the spring 40 and slider bar 30 to achieve the desired results. Of course, the particular factors associated with the particular installation will need to also be considered. For example, the leg size and the inertia associated with the legs should be considered. Typically, the predetermined speed the striker 36, 38 can hit the slider bar 30 and cause the slider bar 30 and the spring 40 to deflect should be faster than the speed the ramp 16 moves in normal lowering operations.

According to some embodiments of the present invention, the support legs 20 and 22 are dimensioned so that the maximum the ramp 16 will fall in a free fall before being supported by the support legs 20,22 or reaching the lowest position is about 8 inches. One skilled in the art along with the disclose made herein will be able to make the appropriate design choices with respect to the springs 20, 40 and legs 20, 22 to achieve the desired results.

According to some embodiments of the invention, and shown in FIGS. 1–4, the support legs 20 and 22 are nested within each other. In the embodiment shown in FIGS. 1–4, the support legs 22 are configured to surround the support legs 20. If the ramp 16 is in a lowered condition so that the support legs 20 have retracted, or at least partially retracted, and the ramp 16 were to descend quickly, the striker 38 would contact the slider bar 30 and deflect the spring 40 and slider bar 30 in a similar manner described above. However, if the ramp 16 were to descend slowly from a position where the ramp 16 was also in a partially lowered condition and the support legs 20 were already retracted, or at least partly retracted, then the striker 38 would contact the slider bar 30 and slide down the slider bar 30 causing the support legs 22 to achieve a retracted position.

According to one embodiment of the present invention as shown in FIG. 3, the ramp 16 has a leg attaching assembly 24 attached to an underneath portion of the ramp 16. The support legs 20, 22 are attached to the leg attaching assembly 24 by a hinge pin 26. A torsion spring 28 biases the support legs 20, 22 to a supporting position. For illustrative purposes, the slider bar 30 is shown in its two extreme conditions. Arrow A points to the slider bar 30 shown in the biased position where it will cause the legs 20,22 to retract when struck in a slow manner and Arrow B shows the slider bar 30 in the position it achieves when it has been struck by a striker 36, 38 descending in a rapid manner. The slider bar 30 is biased to position A by a spring 40. The slider bar 30 is attached to the pit 12 by a slider bar support 32. Holes 47 in the slider bar support 32 allow for the slider bar support 32 to be bolted to the pit 12.

Figure 4:
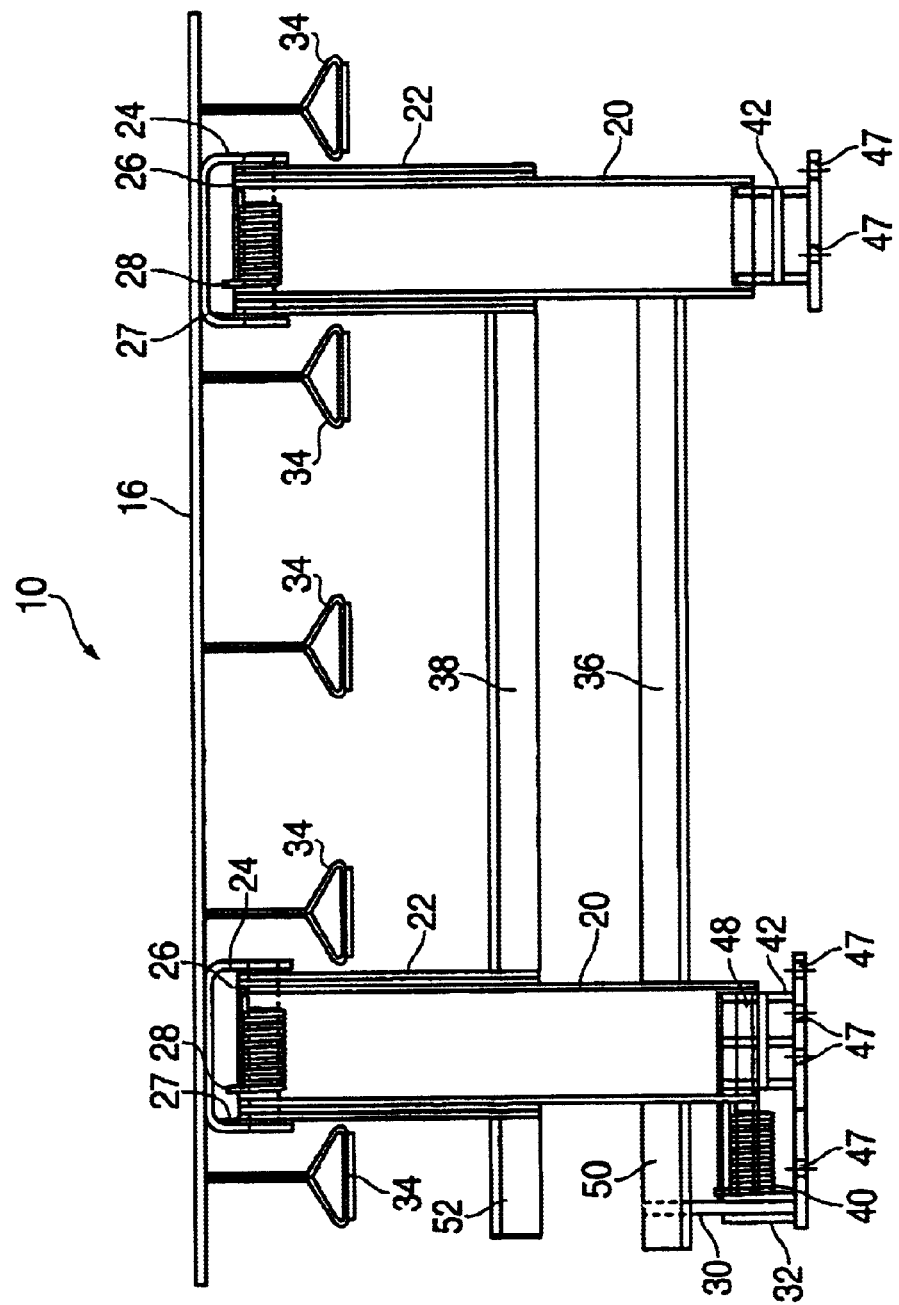
FIG. 4 is an end view of an alternate embodiment of a dock leveler support leg system taken from a position located underneath a ramp of a dock leveler and looking out the front end of the dock leveler. The embodiment shown in FIG. 4 have the slider bar located outside the support legs.

FIG. 4 shows a dock leveler 10 from the perspective of looking out the front of the dock leveler 10 from under the ramp 16. The support legs 20, 22 are attached to the ramp 16 by a leg attaching assembly 24 and a hinge pin 26. The spring 28 biases the support legs 20, 22 to a supporting position. The legs 20, 22 are located between beams 34. The support legs 20 are connected to each other by cross bar 36 and the support legs 22 are connected to each other by cross bar 38. The leg support 42 is configured to support the support legs 20, and may be mounted to the pit 12 by bolts through holes 47. The slider bar 30 is attached to the slider bar support 32 by a hinge pin 48. The slider bar 30 is biased to an upward position by torsion spring 40.

In the embodiment shown in FIG. 4, the slider bar 30 and the slider bar support assembly 32 are located not between the support legs 20, 22, but rather, to one side of the support legs 20 and 22. Striker bars 50 and 52 are provided on support legs 20, 22 respectively and are configured to engage the slider bar 30 in a similar manner as described above. While the embodiments described above and shown in the figures include either cross bars 36 and 38 or striker bars 50 and 52 as engaging the slider bar 30, other embodiments in accordance with the invention may include a separate striker that may be mounted on cross bars 36 and 38 or striker bars 50 and 52. Other embodiments of the invention may use the support legs 20, 22 as strikes.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A support leg system for a dock leveler comprising:
   a striker;

a movable slider bar biased to a first position and configured to move from the first position to a second position when the striker engages the slider bar faster than a predetermined speed; and a first support leg operatively connected to the striker and configured to selectively move between a support position supporting a ramp portion of the dock leveler and a retracted position, the first support leg being biased to the support position and further configured to move to a retracted position when the striker engages the slider bar slower than a predetermined speed and stay in the support position when the striker engages the slider bar faster than the predetermined speed such that the slider bar moves to the second position, further comprising a second support leg and the first and second support legs are connected to each other by a cross bar.

2. The support system of claim 1, wherein the cross bar carries the striker or is the striker.

3. The support leg system of claim 1, wherein the striker is located outside the support legs.

4. The support leg system of claim 1, further comprising a third and fourth support legs dimensioned to be shorter than the first support leg and the second support leg.

5. The support leg system of claim 4, wherein the first support leg, the second support leg, and the third and fourth of support legs are dimensioned to let the ramp free fall a maximum of about eight inches before supporting the ramp.

6. The support leg system of claim 4, wherein the third support leg is nested with the first support leg and fourth support leg is rested with the second support leg.

7. A support leg system for a dock leveler comprising:
   a striker;
   movable slider bar biased to a first position and configured to move from the first position to a second position when the striker engages the slider bar faster than a predetermined speed; and
   a first support leg operatively connected to the striker and configured to selectively move between a support position supporting a ramp portion of the dock leveler and a retracted position, the first support leg being biased to the support position and further configured to move to a retracted position when the striker engages the slider bar slower than a predetermined speed and stay in the support position when the striker engages the slider bar faster than the predetermined speed such that the slider bar moves to the second position, further comprising a roller attached to the support leg.

8. A support leg system for a dock leveler comprising:
   means for striking;
   means for sliding biased to a first position and configured to move from the first position to a second position when the striking means engages the sliding means faster than a predetermined speed; and
   means for supporting a ramp portion of the dock leveler operatively connected to the striking means and configured to selectively move between a support position and a retracted position, the supporting means further configured to move to a retracted position when the striking means engages the sliding means slower than a predetermined speed and stay in the support position when the striking means engages the sliding means faster than the predetermined speed such that the sliding means moves to the second position, wherein the support means further comprises a roller attached to a support leg.

9. A support leg system for a dock leveler having a ramp comprising:
   a striker;
   a movable slider bar biased to a first position and configured to move from the first position to a second position when said striker engages said slider bar at or faster than a predetermined speed; and
   a first set of support legs comprising first and second support legs for supporting the ramp connected to each other by a cross bar, said first set of support legs is biased to a support position and is configured to move to a retracted position when said striker engages said slider bar slower than a predetermined speed and stay in the support position when said striker engages said slider bar at or faster than the predetermined speed.

10. The support leg system of claim 9, wherein said first set of support legs is pivotally connected to the ramp.

11. The support leg system of claim 9, wherein the support leg system provides the sole legs for supporting the dock leveler.

12. The support leg system of claim 9, wherein said cross bar carries said striker or is said striker.

13. The support leg system of claim 9, wherein said striker is located outside said support legs.

14. The support leg system of claim 9, further comprising a second set of support legs comprising a third and fourth support leg connected to each other by a cross bar and dimensioned to be shorter than said first support leg and said second support leg, wherein said second set of support legs is biased to a support position and is configured to move to a retracted position when a second striker engages said slider bar slower than a predetermined speed and stay in the support position when said second striker engages said slider bar at or faster than the predetermined speed.

15. The support leg system of claim 14, wherein said first support leg, said second support leg, and said third and fourth support legs are dimensioned to let the ramp free fall a maximum of about eight inches before supporting the ramp.

16. The support leg system of claim 14, wherein said third support leg is nested with said first support leg and said fourth support leg is nested with the second support leg.

17. The support leg system of claim 9, further comprising a roller attached to each of said support legs.

18. The support leg system of claim 9, further comprising torsion springs biasing said first set of support legs and said slider bar.

19. The support leg system of claim 9, further comprising a support leg support configured to support the support legs when the support legs are in the support position and the ramp is supported by the support legs.

20. A support leg system for a dock leveler having a ramp, Wherein the ramp is movable between a raised and a lowered position, comprising:
   means for supporting the ramp comprising first and second support legs connected by a crossbar, wherein the first and second support legs are configured to selectively move between a support position and a retracted position;
   means for biasing the means for supporting toward the support position; and,
   means for moving the means for supporting from the support position to the retracted position when the ramp moves slower than a predetermined rate toward the lowered position, and for maintaining the means for supporting in the support position when the ramp moves at or greater than the predetermined rate toward the lowered position, wherein the means for moving comprises:

a means for sliding biased to a first position and configured to move from the first position to a second position when the means for supporting engages the sliding means at or faster than a predetermined speed and configured to maintain the first position when the means for supporting engages the sliding means slower than the predetermined speed, wherein the means for supporting provides the sole legs for supporting the ramp.

21. The support leg system of claim 20, wherein the means for supporting further comprises a striker bar.

22. The support leg system of claim 20, wherein the means for supporting further comprises a roller attached to a support leg.

23. A method of reducing stump-out and free fall comprising:

provliding an apparatus for alleviating or preventing free fall and/or stump out for a dock leveler having a ramp comprising:

a striker;

a movable slider bar biased to a first position and configured to move from the first position to a second position when said striker engages said slider bar faster than a predetermined speed; and a support leg system comprising first and second support legs for supporting the ramp connected to each other by a cross bar, wherein said support leg system provides the sole legs for supporting the ramp;

reducing free-fall by biasing said first and second support legs to a support position and maintaining said support position when the ramp falls at or faster than a predetermined-rate; and, reducing stump-out by configuring said first and second support legs to move to a retracted position when said striker engages said slider bar slower than the predetermined speed.

24. The method of claim 23, wherein said cross bar is said striker.

25. The method of claim wherein the dock leveler further comprises a third support leg nested in said first support leg and a fourth support leg nested in said second support leg.

26. The method of claim 23, wherein the striker is connected to at least one of said first or second support legs.

27. The method of claim 23, further comprising continuing to retract said support legs by rolling a roller along a rolling surface.

28. The method of claim 23, further comprising supporting said support legs with a support leg support.

29. A method of operating a dock leveler comprising:

Providing an apparatus for alleviating or preventing free fall and/or stump out for a dock leveler having a ramp and support leg comprising:

A striker;

A movable slider bar biased to a first position and configured to move from the first position to a second position when said striker engages said slider bar faster than a predetermined speed;

and one of the following lowering steps:

Lowering the ramp faster than a predetermined speed and thereby causing the striker to deflect the slider bar and thereby cause the support leg to be in a support position; and Lowering the ramp slower than a predetermined speed and thereby cause the striker to slide across the slider bar, thereby causing the support leg to retract.

30. A method of operating a dock leveler comprising:

Providing an apparatus for alleviating or preventing free fall and/or stump out for a dock leveler having a ramp, a support leg, and a support leg retracting roller; the method comprising:

Providing an apparatus for alleviating or preventing free fall and/or stump out for a dock leveler having a ramp and support leg comprising:

A striker;

A movable slider bar biased to a first position and configured to move from the first position to a second position when said striker engages said slider bar faster than a predetermined speed; and one of the following lowering steps:

Lowering the ramp faster than a predetermined speed and thereby causing the striker to deflect the slider bar and thereby cause the support leg to be in a support position; and Lowering the ramp slower than a predetermined speed and thereby cause the striker to slide across the slider bar, thereby causing the support leg to retract and continuing to retract the support leg by continuing to lower the ramp and thereby causing the retracting roller to roll along a rolling surface such that the farther the support leg retracts, the farther the retracting roller advances along the rolling surface.

* * * * *